US009762386B1

(12) United States Patent
Nassaje et al.

(10) Patent No.: US 9,762,386 B1
(45) Date of Patent: Sep. 12, 2017

(54) VERIFICATION OF STORED ENCRYPTION KEYS IN MULTI-TIERED ENCRYPTION SYSTEM

(71) Applicant: AbeBooks Inc., Victoria, British Columbia (CA)

(72) Inventors: Ali Mustafa Nassaje, Victoria (CA); Julie Anne Margaret Sparrow, Victoria (CA); Kerry Michael Wright, Victoria (CA); Erik James Fuller, Victoria (CA); Volker R. A. Tilgner, Victoria (CA)

(73) Assignee: AbeBooks Inc., Victoria, British Columbia (CA)

( * ) Notice: Subject to any disclaimer, the term of this patent is extended or adjusted under 35 U.S.C. 154(b) by 346 days.

(21) Appl. No.: 14/577,843

(22) Filed: Dec. 19, 2014

(51) Int. Cl.
*H04L 29/06* (2006.01)
*H04L 9/08* (2006.01)

(52) U.S. Cl.
CPC ........ *H04L 9/0819* (2013.01); *H04L 63/0428* (2013.01); *H04L 2209/24* (2013.01)

(58) Field of Classification Search
CPC ........ H04L 9/08; H04L 9/0428; H04L 9/0819
See application file for complete search history.

(56) References Cited

U.S. PATENT DOCUMENTS

| 9,172,532 | B1* | 10/2015 | Fuller | H04L 9/0822 |
| 2010/0198687 | A1* | 8/2010 | Bang | G06F 21/10 |
| | | | | 705/14.53 |
| 2013/0326233 | A1* | 12/2013 | Tolfmans | H04L 9/0894 |
| | | | | 713/189 |

* cited by examiner

*Primary Examiner* — Brandon Hoffman
*Assistant Examiner* — Thong Truong
(74) *Attorney, Agent, or Firm* — Knobbe Martens Olson & Bear LLP (57) ABSTRACT

A background module in a multi-tiered encryption system verifies the integrity of keys used to encrypt and decrypt data. Each encryption tier in the system can include a node programmed to service encryption and/or decryption requests, a key store to store encryption keys, and an audit log to store key identifiers. Each computing node may include a background module that continuously or periodically verifies the integrity of keys. For example, the background module may retrieve an identifier in the audit log, retrieve the object stored at a location in the key data store identified by the identifier, decrypt the encrypted key in the object, and use the decrypted key to decrypt the encrypted identifier in the object. The identifier is compared with the decrypted identifier, and if the identifiers do not match, the background module generates an alert indicating that the key is not valid.

27 Claims, 5 Drawing Sheets

VERIFICATION OF STORED ENCRYPTION KEYS IN MULTI-TIERED ENCRYPTION SYSTEM

BACKGROUND

To protect transmissions of sensitive data, an electronic device may encrypt the sensitive data before transmission. Once the transmission reaches the intended recipient, the intended recipient may decrypt the transmitted data to extract the sensitive data. In some cases, the electronic devices may request an external service to perform the encryption and decryption via a network. Encryption and decryption can be processor intensive, so offloading such tasks to an external service can allow the electronic devices to dedicate resources to other processes.

The external service may include devices that operate by encrypting or decrypting data using one or more keys. For example, a user device may transmit data to the external service for encryption, and the external service may then encrypt the data using a key and transmit the encrypted data to the user device. At a later time, the user device may transmit the encrypted data to the external service for decryption. The external service may identify the key used to encrypt the data and decrypt the encrypted data using the identified key. Thus, user data may be lost if the key becomes corrupted or otherwise unusable.

DETAILED DESCRIPTION

Introduction

As described above, devices included in an external service can be used to perform encryption and decryption services. However, because the external service, rather than a user device, performs encryption and decryption and the keys are unavailable for storage on the user device, user data can be lost if keys used by the external service to perform the encryption and decryption become corrupted or otherwise unusable. For example, if a key is missing (e.g., not located in the key store at a location referenced by an identifier associated with the key), modified (e.g., such that the key uses a different process to encrypt and/or decrypt data, thereby generating different results), unreadable (e.g., due to data corruption), or the like, then user data associated with the key may no longer be encryptable or decryptable. Such issues can be problematic if discovered only when a user device requests an encryption or decryption operation using the key. If, instead, the issues are discovered beforehand, the issues may be correctable and the user device may be provided with uninterrupted service.

Accordingly, a key verification system is described herein that continuously or periodically verifies the integrity of keys generated by an external encryption service. For example, the external encryption service may be a multi-tiered encryption system that includes one or more encryption tiers. Each encryption tier can include a computing node (e.g., a computing device including one or more processors coupled to a memory) programmed to service encryption and/or decryption requests and a key store (e.g., a computer-readable storage medium or device) to store encryption keys. Furthermore, each encryption tier can execute instructions to encrypt an unencrypted payload and/or to decrypt an encrypted payload. The multi-tiered encryption systems may include policies that limit the number of times an encryption key can be used to encrypt an unencrypted payload. Multi-tiered encryption systems are described in greater detail in U.S. patent application Ser. No. 14/084,440, titled "MULTI-TIERED ENCRYPTION SYSTEM FOR EFFICIENTLY REGULATING USE OF ENCRYPTION KEYS" and filed on Nov. 19, 2013, the disclosure of which is hereby incorporated herein by reference in its entirety.

Each computing node may include a background thread or module that continuously or periodically verifies the integrity of keys stored in the key store of the computing node's encryption tier. When the computing node generates a new key that is stored in the key store, the computing node may generate a uniform resource identifier (URI) that indicates a location where the key will be stored in the key store and stores the URI in an audit log. The computing node may further encrypt the URI using the generated key and encrypt the generated key using a parent key. As an example, the parent key may be a key stored in a key store associated with another encryption tier. The multi-tiered encryption system can be referred to as an n-tiered encryption system, and the new key may be generated by the computing node of Tier(n) (e.g., a highest encryption tier). The key used to encrypt the new key may originate from Tier(n−1) (e.g., a lower encryption tier such that Tier(n) is an encryption tier that is higher than Tier(n−1)) or any of the encryption tiers Tier(0), Tier(1), Tier(2), etc. The computing node may generate an object (e.g., a JavaScript object notation (JSON) object) that includes the encrypted key, the encrypted URI, and/or other parameters and store the object in the key store associated with the computing node's encryption tier.

The background thread may iterate through the audit log and verify each key identified by the URIs stored in the audit log. For example, the background thread may retrieve a first URI in the audit log and retrieve the object stored at a location in the key store identified by the first URI. The background thread may decrypt the encrypted key in the object to form a decrypted key, and use the decrypted key to decrypt the encrypted URI in the object to form a decrypted URI. The background thread can compare the first URI with the decrypted URI. If the first URI and the decrypted URI match or otherwise correlate, then the background thread determines that the decrypted key associated with the first URI is valid. If the first URI and the decrypted URI do not match or otherwise correlate, then the background thread determines that the decrypted key associated with the first URI is not valid. In addition, the background thread may determine that the decrypted key is not valid if the object cannot be retrieved from the key store, if the encrypted key cannot be decrypted, and/or if the encrypted URI cannot be decrypted. In one embodiment, the validity of a decrypted key is determined by whether the encrypted key is available and/or accessible at the location indicated by the URI, whether the decrypted key is usable to encrypt or decrypt data, whether the encrypted or decrypted key is unmodified (e.g., has not been modified since the encrypted key was stored in the key store), and/or whether the integrity of the encrypted or decrypted key is otherwise uncompromised. The background thread may generate an alert to indicate that the decrypted key associated with the first URI is not valid. The alert may be transmitted to a user device that has received data encrypted using the invalid key (e.g., when the background thread determines that the decrypted key is not valid, when the user device requests the decryption of data encrypted using the invalid key, etc.), may be transmitted to an administrator (e.g., so the administrator can try to fix the problem by, for example, restoring the key), and/or may be transmitted to another module in the computing node that initiates an auto-healing feature. For example, another module may initiate a restore procedure to try to restore a previous version of the decrypted key that may be valid (e.g., that is accessible, usable, unmodified, not corrupted, etc.). The background thread may then repeat the process for the next URI in the audit log. Once the background thread reaches the last URI in the audit log, the background thread may again repeat the process for the first URI in the audit log.

In some embodiments, a single audit log is associated with a single key store. For example, each URI stored in the audit log may point to a location in a single key store. In other embodiments, a single audit log is associated with a plurality of key stores. For example, the audit log may store URIs that point to one of a plurality of key stores. In such a situation, the background threads in the computing nodes may each analyze a portion of the audit log. A controller present in the external encryption service may provide instructions to each background thread to indicate what portions of the audit log the respective background thread should analyze.

In some embodiments, the computing node stores additional data in the audit log. For example, the computing node may store a known value (e.g., data of any size) or a reference to a known value in the audit log. The computing node may further store an encrypted version of the known value in the object, where the known value is encrypted using the decrypted key associated with the object. The encrypted version of the known value can be stored in addition to the encrypted URI or in place of the encrypted URI. The background thread may then retrieve the known value from the audit log or from a location referenced by the data in the audit log and compare the retrieved known value with a decrypted version of the encrypted known value (decrypted using the key) instead of comparing the first URI and the decrypted URI. If the comparison does not yield a match (or any of the steps or operations performed by the background thread to perform the comparison fail), then the background thread may determine that the key is not valid. As another example, the computing node may store a hash of the decrypted key (or any signature of the decrypted key) in the audit log. The background thread may then retrieve the hash of the decrypted key from the audit log, decrypt the encrypted version of the key in the object to form a second version of the decrypted key, generate a hash of the second version of the decrypted key, and compare the retrieved hash with the generated hash. If the comparison does not yield a match (or any of the steps or operations performed by the background thread to perform the comparison fail), then the background thread may determine that the key is not valid.

The external encryption service described herein may provide several benefits. For example, by storing URIs in audit logs upon generation of the keys, the external encryption service ensures that the availability, usability, and integrity of every generated key can be verified. Furthermore, possible issues with keys include an unrecorded moving of a key (such that the key cannot be found), a modification of a key, a corruption of the key (such that the key is no longer readable), and/or the like. Such issues can cause a decrypt operation to fail. By using a decrypt operation in the verification process, the external encryption service is able to determine whether a decrypt operation using the key will succeed or fail before any user devices requests such a service. In addition, the external encryption service provides mechanisms to rectify any issues with the keys via the auto-healing features described above.

Key Verification System Overview

Figure 1A:
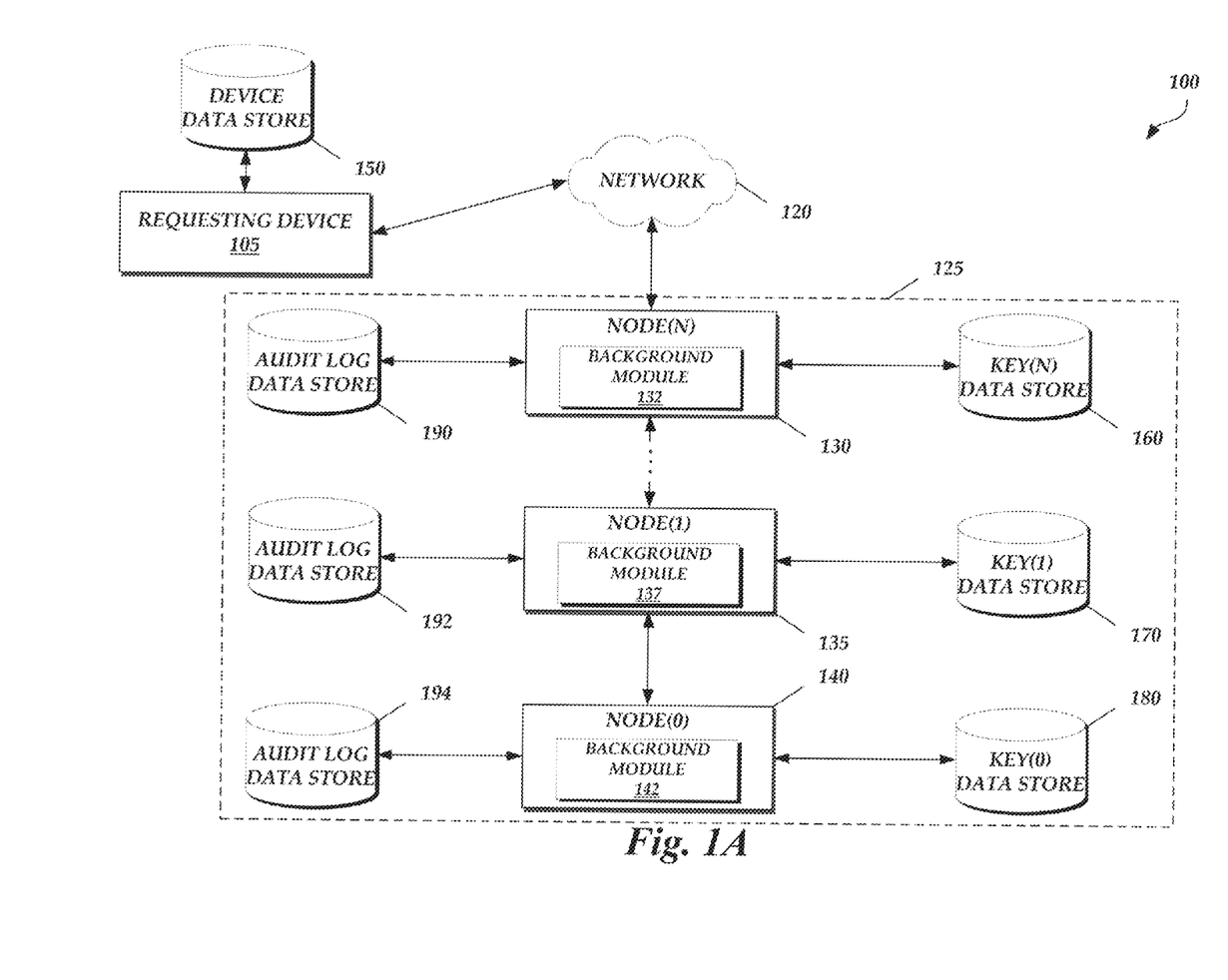
FIG. 1A illustrates a block diagram of a key verification system in a multi-tiered encryption service.

FIG. 1A illustrates a block diagram of a key verification system in a multi-tiered encryption service 100 according to one embodiment. As illustrated in FIG. 1A, the multi-tiered encryption service 100 includes a requesting device 105, a network 120, a multi-tiered encryption system 125, and a device data store 150.

The requesting device 105 can be configured to submit encryption and/or decryption requests to the multi-tiered encryption system 125. For example, such requests may include requests to encrypt and/or decrypt electronic messages (e.g., e-mails, text messages, etc.), credit card data (e.g., credit card numbers, billing information, etc.), identifications (e.g., driver's licenses, passports, etc.), bank account information, and/or other sensitive data. Such requests can be made via the network 120. The requesting device 105 can retrieve data to be encrypted or decrypted and/or key references (e.g., key URIs) from the device data store 150.

In an embodiment, the requesting device 105 may be a user computing device. For example, the requesting device 105 can include a wide variety of electronic devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. The requesting device 105 may include a microphone, a speaker, a wireless module, a camera, and/or a display.

In an embodiment, the device data store 150 may store data that is to be encrypted, data that is to be decrypted, and/or key references that identify an encryption key used to encrypt already encrypted data. In some embodiments, the device data store 150 is a single data store. In other embodiments, the device data store 150 is distributed over many different locations.

The network 120 may be a wired network, a wireless network, or a combination of the two. For example, the network 120 may be a personal area network, a local area network (LAN), a wide area network (WAN), or combinations of the same. Protocols and components for communicating via any of the other aforementioned types of communication networks, such as the TCP/IP protocols, can be used in the network 120.

In an embodiment, the multi-tiered encryption system 125 is configured to perform any or all of the operations disclosed herein other than those performed by the requesting device 105. As illustrated in FIG. 1A, the multi-tiered encryption system 125 includes node(N) 130, node(1) 135, node(0) 140, key(N) data store 160, key(1) data store 170, key(0) data store 180, audit log data store 190, audit log data store 192, and audit log data store 194. For simplicity, the integer N is assumed to be a 2 in the disclosure such that the multi-tiered encryption system 125 is a three-tiered encryption system. However, while the particular multi-tiered encryption system 125 illustrated in FIG. 1A may be a three-tiered encryption system, this is not meant to be limiting. The number of tiers may alternatively be 2, 4, 5, 6, or any other positive integer. For example, one or more additional nodes may be present between node(N) 130 and node(1) 135. In addition, while each tier in the multi-tiered encryption system 125 includes one node 130, 135, or 140, this is not meant to be limiting. The number of nodes per tier may alternatively be 2, 3, 4, 5, 6, or any other positive integer. Furthermore, while each node 130, 135, and 140 is associated with a separate key data store 160, 170, and 180 and a separate audit log data store 190, 192, and 194, this is not meant to be limiting, as one or more of the key data stores 160, 170, and/or 180 can be combined into a single key data store and one or more of the audit log data stores 190, 192, and/or 194 can be combined into a single audit log data store (see FIG. 1B). For example, node(N) 130, node(1) 135, node(0) 140, and/or any nodes between node(N) 130 and node(1) 135 can share a key data store 160, 170, and/or 180 and/or can share an audit log data store 190, 192, and/or 194. Moreover, any combination of nodes 130, 135, and/or 140 can be housed in the same device or different devices and any combination of nodes 130, 135, and/or 140 can be associated with the same local network. In addition, one or more of the audit log data stores 190, 192, and/or 194 can be combined into a single audit log data store and associated with nodes of multiple multi-tiered encryption systems 125.

In an embodiment, each node 130, 135, and 140 is a computing device including one or more processors coupled to a memory configured to service an encryption or decryption request. Each node 130, 135, and 140 may also store the URIs of keys in the respective audit log data store 190, 192, and 194 when the keys are generated. Upon generation of a new key, the nodes 130, 135, and 140 may also generate an object (e.g., such as a JSON object) that includes an encrypted version of the new key (e.g., encrypted using a parent key from, from example, a key data store in another encryption tier) and the encrypted version of the URI of the new key (e.g., encrypted using the new key). The nodes 130, 135, and 140 may store the object in the corresponding key data store 160, 170, or 180.

Node(N) 130 may include a background module 132 that performs the key verification process described herein. The background module 132 may verify the keys stored in the key data store 160 using the audit log data store 190. For example, the background module 132 may retrieve a URI from the audit log data store 190 and retrieve an object in the key data store 160 identified by the retrieved URI. The background module 132 may decrypt the encrypted version of the key stored in the object using a parent key (e.g., the parent key may be identified by the URI) to form a decrypted key and may then decrypt the encrypted version of the URI stored in the object using the decrypted key to form a decrypted URI. If the background module 132 determines that the retrieved URI and the decrypted URI do not match, then the key is not valid. In addition, the background module 132 may determine that the key (e.g., the decrypted key) is not valid if the object cannot be retrieved from the key data store 160, if the encrypted version of the key cannot be decrypted, and/or if the encrypted version of the URI cannot be decrypted. In one embodiment, the validity of the decrypted key is determined by whether the encrypted key is available and/or accessible at the location indicated by the retrieved URI, whether the decrypted key is usable to encrypt or decrypt data, whether the encrypted or decrypted key is unmodified (e.g., has not been modified since the encrypted key was stored in the key store), and/or whether the integrity of the encrypted or decrypted key is otherwise uncompromised. Based on a determination that the decrypted key is not valid, the background module 132 may perform one of several operations, as described below. The background module 132 may then retrieve the next URI in the audit log data store 190 (or the first URI in the audit log data store 190 if the background module 132 last retrieved the last URI in the audit log data store 190) and repeat the process. The background module 132 may operate continuously or periodically in the background as the node(N) 130 handles encrypt and/or decrypt operations. The computing resources of the node(N) 130 may be allocated such that priority is given to encrypt and/or decrypt operations and the background module 132 operates when the computing resources are idle or in use less than some threshold (e.g., 50% usage). Likewise, node 135 may include a background module 137 that operates similar to the background module 132 and verifies the keys stored in the key data store 170 using the audit log data store 192 and the node 140 may include a background module 142 that operates similar to the background module 132 and that verifies the keys stored in the key data store 180 using the audit log data store 194.

In some embodiments, if the background modules 132, 137, or 142 determine that the key is not valid, the background modules 132, 137, or 142 may generate an alert. In other embodiments, not shown, the multi-tiered encryption system 125 may include a separate alert module that generates alerts for one or more of the background modules 132, 137, or 142. The alert may indicate that the key is not valid. The alert may be transmitted (e.g., as any electronic message, such as an e-mail, text message, etc.) to another module (e.g., a restore module, another node 130, 135, or 140) or another device (e.g. a requesting device 105, an administrator device, etc.). Before and or after transmitting the alert (if the alert is transmitted), the background modules 132, 137, or 142 (or another module of the respective node 130, 135, or 140, not shown) may attempt an auto-healing procedure by restoring a previous version of the key. The data stored in the key data stores 160, 170, and 180 may be periodically backed up. A restore operation may re-persist a backed-up version of the object to the respective key data store 160, 170, or 180, where the backed-up version of the object may include a valid version of the key when decrypted (e.g., a key for which the availability, usability, and integrity of the key can be verified). If the backed-up version of the object does not correct the issue (e.g., the key verification process still fails for the key in question), then the background module 132, 137, or 142 may remove the key from service. For example, the key may still be stored in an object in the key data store 160, 170, or 180. However, the node 130, 135, or 140 may be notified that no data received in the future should be encrypted using the key. The node 130, 135, and 140 may also transmit the alert to a requesting device 105 that requests a decryption of data using the corrupted, decrypted key (at the time the request is made) indicating that the decrypted key can no longer be used to decrypt any data. Alternatively, the node 130, 135, and 140 may also transmit the alert to any requesting device 105 that received data encrypted using the corrupted, decrypted key at the time that the auto-healing procedure fails.

If the backed-up version of the object does correct the issue (e.g., the key verification process succeeds for the key in question), then the background module 132, 137, or 142 may not transmit the alert to another module or device, or may notify the modules or devices that received the alert that the decrypted key can be used once again for encryption and/or decryption services. The background module 132, 137, or 142 may verify the integrity of the backed-up version of the object at the time that the backed-up version is restored or once the background module 132, 137, or 142 comes back to the URI in question after verifying the keys associated with the other URIs in the audit log data store 190, 192, or 194 (thus, the transmission of any alert may be delayed). In alternate embodiments, if the background modules 132, 137, or 142 determine that the compared URIs do not match or otherwise correlate, the background modules 132, 137, or 142 notify another module (not shown) or an administrator to begin the auto-healing procedure.

In some embodiments, the node(N) 130, the node(1) 135, and the node(0) 140 (and any nodes between node(N) 130 and node(1) 135) store additional data in the audit log data stores 190, 192, and 194. For example, node(N) 130 (or any of the other nodes) may store a known value (e.g., data of any size) or a reference to a known value in the audit log data store 190 (or any of the other audit log data stores) in an entry associated with a URI. The node(N) 130 (or any of the other nodes) may further store an encrypted version of the known value in the object, where the known value is encrypted using the decrypted key associated with the object. The encrypted version of the known value can be stored in addition to the encrypted URI or in place of the encrypted URI. The background module 132 (or any of the other background modules) may then retrieve the known value from the audit log data store 190 (or any of the other audit log data stores) or from a location referenced by the data in the audit log data store 190 and compare the retrieved known value with a decrypted version of the encrypted known value (e.g., decrypted by the background module 132 using the decrypted key) instead of comparing the URIs as described above. If the comparison does not yield a match or correlation (or any of the steps or operations performed by the background module 132 to perform the comparison fail), then the background module 132 may determine that the key is not valid. As another example, the node(N) 130 (or any of the other nodes) may store a hash of the decrypted key (or any signature of the decrypted key) in the data store 190 (or any of the other audit log data stores) in an entry associated with a URI. The background module 132 (or any of the other background modules) may then retrieve the hash of the decrypted key from the audit log data store 190 (or any of the other audit log data stores), decrypt the encrypted version of the key in the object to form a second version of the decrypted key, generate a hash of the second version of the decrypted key, and compare the retrieved hash with the generated hash. If the comparison does not yield a match (or any of the steps or operations performed by the background module 132 to perform the comparison fail), then the background module 132 may determine that the decrypted key is not valid.

Each key data store 160, 170, and 180 can include a non-transitory computer-readable storage medium configured to store objects that include encrypted encryption keys and encrypted URIs. Each audit log data store 190, 192, and 194 can also be a non-transitory computer-readable storage medium configured to store URIs. The audit log data stores 190, 192, and 194 may be configured to be write-only and read-only data stores such that information cannot be removed from the audit log data stores 190, 192, and 194. As referred to herein, node(0) 140, key(0) data store 180, and audit log data store 194 together can be considered Tier(0), node(1) 135, key(1) data store 170, and audit log data store 192 together can be considered Tier(1), and node(N) 130, key(N) data store 160, and audit log data store 190 together can be considered Tier(N) (or Tier(2) as described herein).

In other embodiments, not shown, the multi-tiered encryption system 125 can be local to the requesting device 105. For example, the multi-tiered encryption system 125 can be executed by a processor embedded within the requesting device 105. As another example, the multi-tiered encryption system 125 can be executed by another device coupled directly to the requesting device 105 (e.g., via a wired or wireless connection, such as USB, IEEE 1394, IEEE 802.11, Bluetooth, etc.). The multi-tiered encryption system 125, when local to the requesting device 105, can perform any of the operations discussed herein.

Figure 1B:
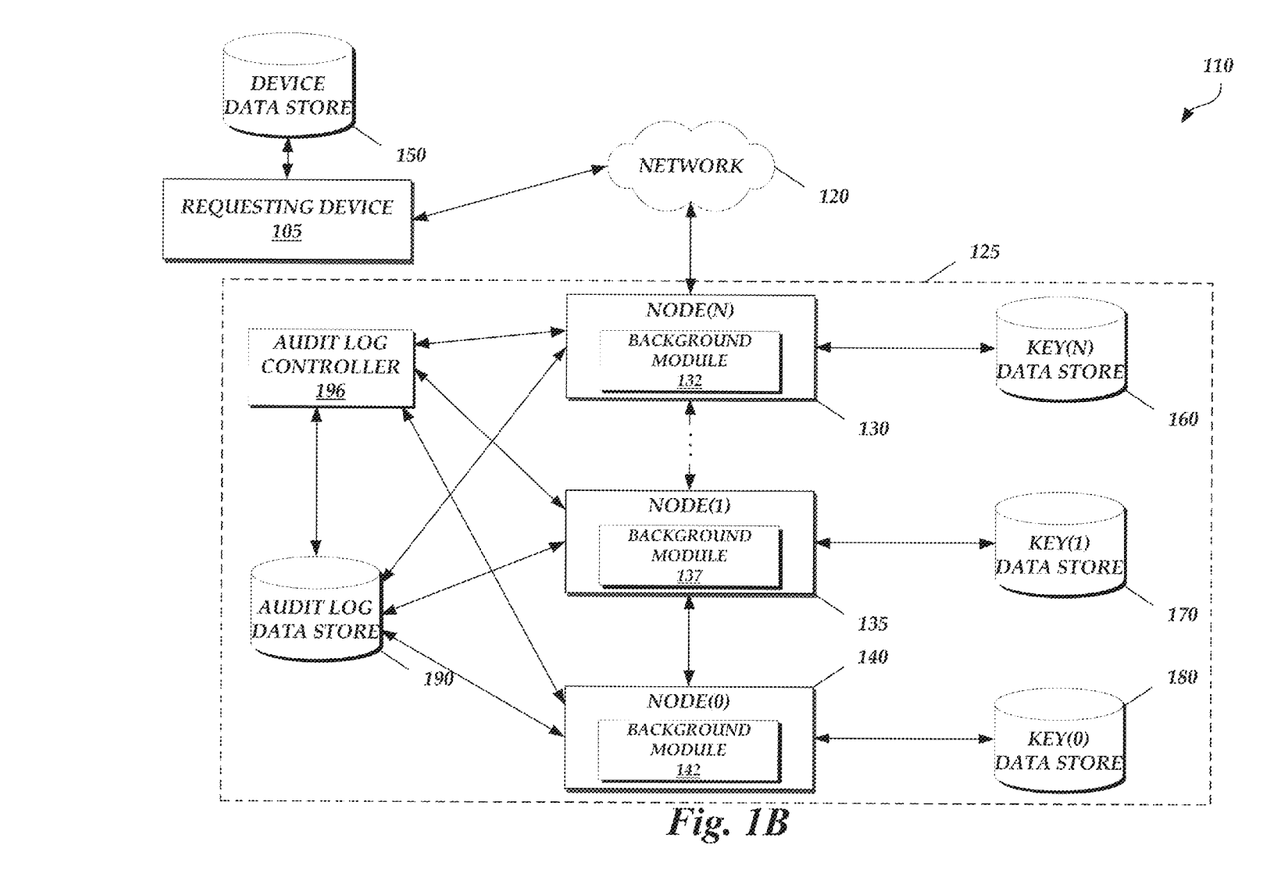
FIG. 1B illustrates another block diagram of a key verification system in a multi-tiered encryption service.

FIG. 1B illustrates another block diagram of a key verification system in a multi-tiered encryption service 110. The multi-tiered encryption service 110 is similar to the multi-tiered encryption service 100 of FIG. 1A. However, the multi-tiered encryption system 125 includes a single audit log data store 190 that is associated with the nodes 130, 135, and 140. The single audit log data store 190 may store URIs that point to objects stored in the key data stores 160, 170, and 180. The multi-tiered encryption system 125 further includes an audit log controller 196 that provides instructions to the background modules 132, 137, and 142 to indicate what portions of the audit log data store 190 the background modules 132, 137, and 142 are to access to perform the key verification process described herein. For example, the background modules 132, 137, and 142 may request from the audit log controller 196 a value that identifies the next entry in the audit log data store 190 that the respective background module 132, 137, and 142 should retrieve after completing the key verification process for a previous entry. The audit log controller 196 may store the associations between the entries in the audit log data store 190 and the background modules 132, 137, and 142 or may retrieve this information from the audit log data store 190.

In an embodiment, the audit log data store 190 is divided into three portions, where each portion is associated with a node 130, 135, and 140. For example, the first third of the audit log data store 190 may be associated with the node(N) 130, the second third of the audit log data store 190 may be associated with the node(1) 135, and the last third of the audit log data store 190 may be associated with the node(0) 140. As another example, every third entry in the audit log data store 190 may be associated with the same node 130, 135, or 140. Any method of dividing a whole into three parts (e.g., using a modulation of a hash, a random number generator, etc.) may be used to divide the audit log data store 190 into the three portions. The audit log controller 196 may store the association between the portions of the audit log data store 190 and the nodes 130, 135, and 140.

Example Audit Log Creation Process

Figure 2:
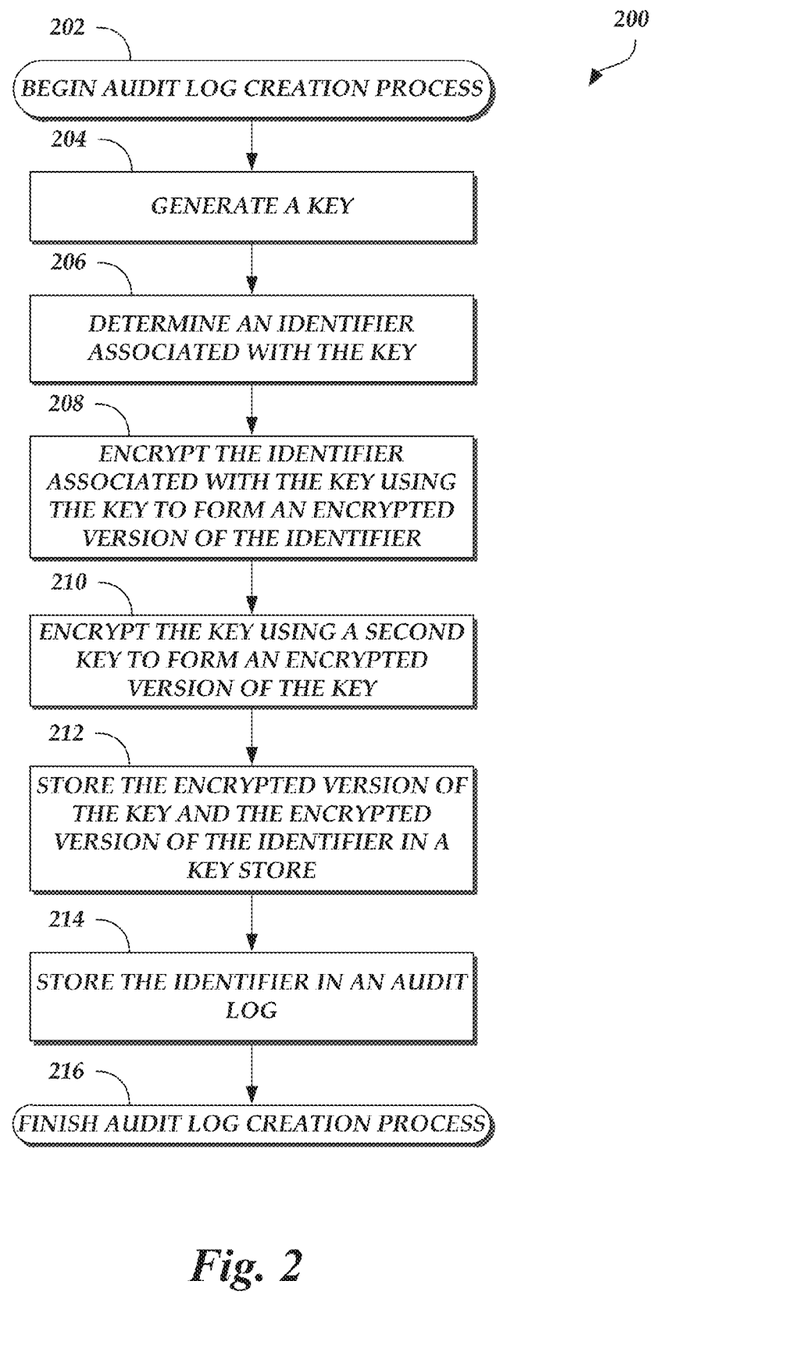
FIG. 2 illustrates a process that may be used by a computer system to generate an audit log.

FIG. 2 illustrates a process 200 that may be used by a computer system to generate an audit log. As an example, the multi-tiered encryption system 125 of FIG. 1A or 1B, and specifically the nodes 130, 135, or 140, can be configured to execute the audit log creation process 200. The audit log creation process 200 begins at block 202.

At block 204, a key is generated. The key may be generated when a requesting device, such as the requesting device 105, requests an encryption operation and other available keys have been exhausted or are otherwise unavailable for use.

At block 206, an identifier associated with the key is identified. The identifier may be a URI that indicates a location in a key data store where an object that includes an encrypted version of the generated key will be stored.

At block 208, the identifier associated with the key is encrypted using the key to form an encrypted version of the identifier. For example, the URI may be encrypted using the key.

At block 210, the key is encrypted using a second key to form an encrypted version of the key. In an embodiment, the second key is a parent key stored in a key data store associated with a different encryption tier than the encryption tier of the key. For example, the parent key may be a part of the next lowest encryption tier.

At block 212, the encrypted version of the key and the encrypted version of the identifier are stored in a key store. For example, the encrypted version of the key and the encrypted version of the identifier may be stored in an object, and the object may be stored in the key store. The object may be a JSON object.

At block 214, the identifier is stored in an audit log. The audit log may be an append-only text file that includes entries for a plurality of identifiers. The audit log may be associated with the encryption tier of the key store. Alternatively, the audit log may be associated with a plurality of encryption tiers. In further embodiments, a known value or a hash of the key is stored in the audit log (e.g., if the background modules compare a retrieved known value with a decrypted known value or compare a retrieved hash of the key with a generated hash of the key to determine validity of the key). After the identifier is stored in the audit log, the audit log creation process 200 ends, as illustrated at block 216.

Figure 3:
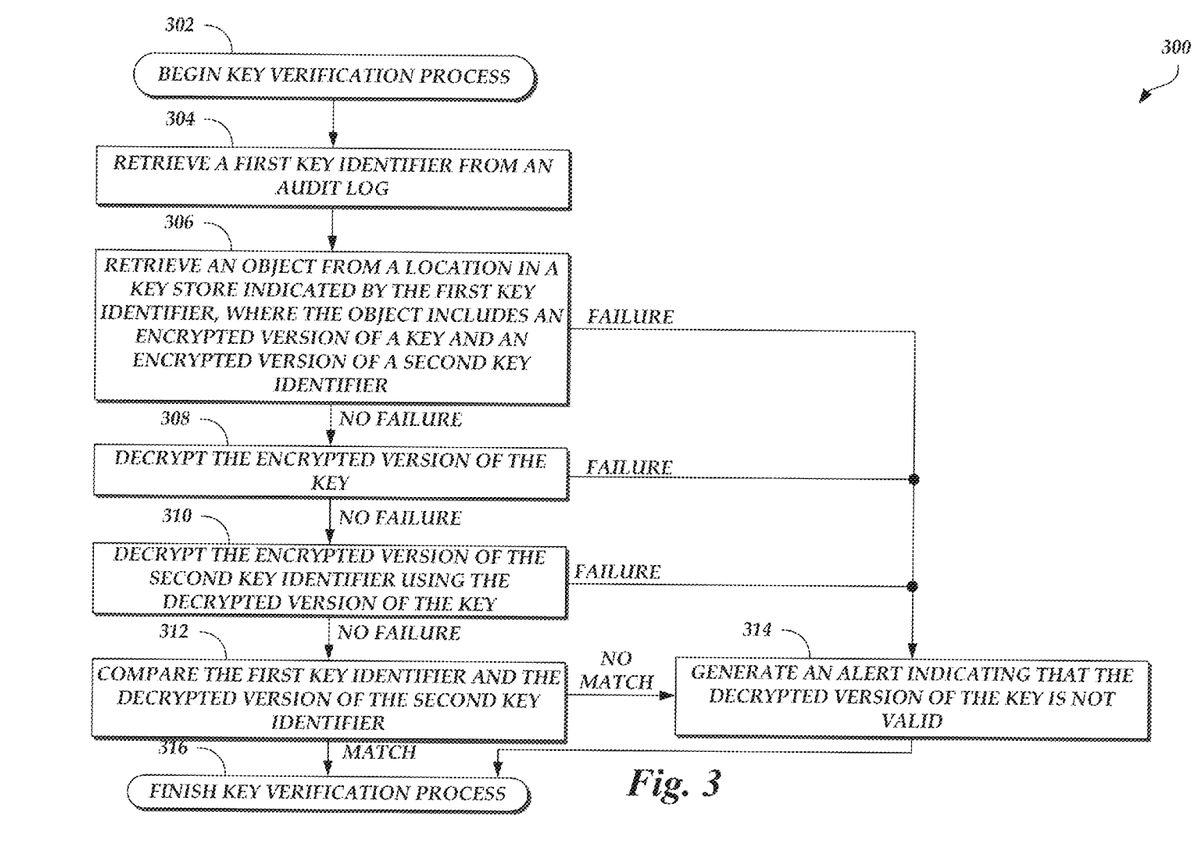
FIG. 3 illustrates a process that may be used by a computer system to verify a key.

FIG. 3 illustrates a process 300 that may be used by a computer system to verify a key. As an example, the multi-tiered encryption system 125 of FIG. 1A or 1B, and specifically the background modules 132, 137, or 142 of the nodes 130, 135, or 140, can be configured to execute the key verification process 300. The key verification process 300 begins at block 302.

At block 304, a first key identifier is retrieved from an audit log. The first key identifier may be a URI associated with a first key.

At block 306, an object is retrieved from a location in a key store indicated by the first key identifier. The object may include an encrypted version of a key and an encrypted version of a second key identifier. The object may be a JSON object. If retrieval of the object fails, then key verification process 300 proceeds to block 314. Otherwise, the key verification process 300 proceeds to block 308.

At block 308, the encrypted version of the key is decrypted to form a decrypted version of the key. The encrypted version of the key may be decrypted using a parent key stored in a key store associated with an encryption tier that is different than the encryption tier of the key store from which the object was retrieved. If decryption of the encrypted version of the key fails, then key verification process 300 proceeds to block 314. Otherwise, the key verification process 300 proceeds to block 310.

At block 310, the encrypted version of the second key identifier is decrypted using the decrypted key to form a decrypted version of the second key identifier. For example, the decrypted version of the key can be used to recover the second key identifier. If decryption of the encrypted version of the second key identifier fails, then the key verification process 300 proceeds to block 314. Otherwise, the key verification process 300 proceeds to block 312.

At block 312, the first key identifier and the decrypted version of the second key identifier are compared. For example, the URI stored in the audit log and the decrypted URI are compared. If the first key identifier and the decrypted version of the second key identifier do not match, then key verification process 300 proceeds to block 314. Otherwise, the key verification process 300 ends, as illustrated at block 316.

At block 314, an alert is generated indicating that the decrypted version of the key is not valid. The decrypted version of the key may not be valid if the decrypted version of the key is not usable, has been modified, or the integrity of the key has otherwise been compromised. The alert may be transmitted to another module or device. The generation of the alert may also trigger an auto-healing process to restore a previous version of the object and/or the decrypted version of the key. After the alert is generated, the key verification process 300 ends, as illustrated at block 316.

Example Audit Log and Key Data Stores

Figure 4:
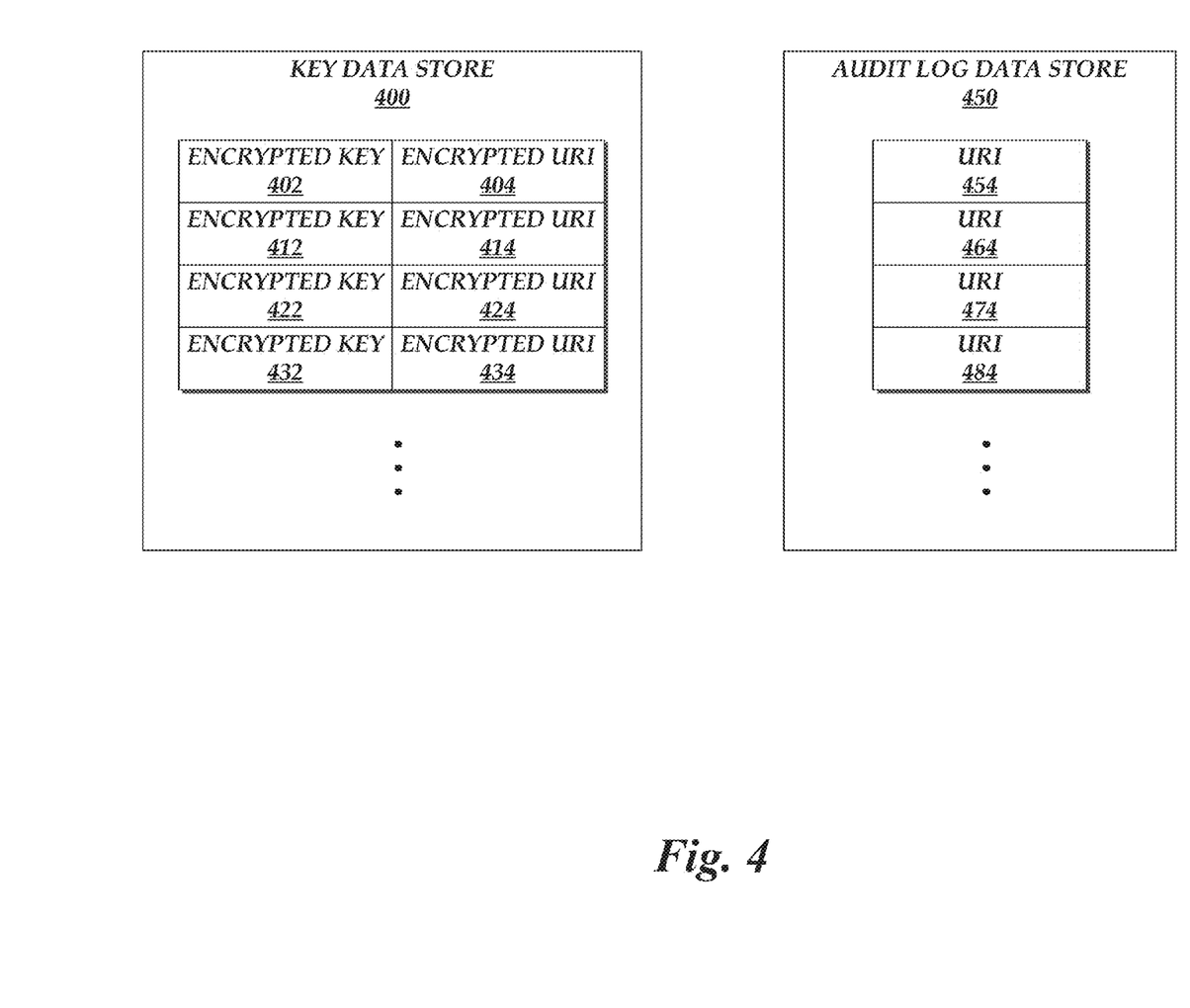
FIG. 4 illustrates contents of an exemplary key data store and an exemplary audit log data store.

FIG. 4 illustrates contents of an exemplary key data store 400 and an exemplary audit log data store 450. As illustrated in FIG. 4, the key data store 400 includes various objects, where each object includes an encrypted key 402, 412, 422, and 432, an encrypted URI 404, 414, 424, and 434, and/or other data (not shown). For example, the objects may include a known value encrypted using the respective key 402, 412, 422, and 432 if the background modules 132, 137, and/or 142 compare a retrieved known value and a decrypted version of a known value rather than the URIs. The encrypted known values may replace the encrypted URI 404, 414, 424, and 434 and may be included in the objects in addition to the encrypted URI 404, 414, 424, and 434. As described herein, each encrypted identifier 404, 414, 424, and 434 is encrypted using a decrypted version of the corresponding encrypted key 402, 412, 422, and 432. While FIG. 4 illustrates four objects in the key data store 400, this is not meant to be limiting. The key data store 400 may include any number of objects. Furthermore, each object may include additional data, not shown.

The audit log data store 450 includes URIs 454, 464, 474, and 484. The audit log data store 450 may further include a known value or a reference to a location where a known value is stored (not shown) if the background modules 132, 137, and/or 142 compare a retrieved known value and a decrypted version of a known value rather than the URIs. Alternatively, the audit log data store 450 may further include a hash of the key if the background modules 132, 137, and/or 142 compare a retrieved hash of the key with a generated hash of the key rather than the URIs. If the keys in the key data store 400 are uncorrupted, then the URIs 454, 464, 474, and 484 may match decrypted versions of the encrypted URIs 404, 414, 424, and 434, respectively. While FIG. 4 illustrates four objects in the audit log data store 450, this is not meant to be limiting. The audit log data store 450 may include any number of URIs. For example, the audit log data store 450 may store URIs that point to locations in different key data stores.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of verifying key integrity, the computer-implemented method comprising:
by execution of specific program instructions by a computing device:
retrieving a first key identifier from an entry in an audit log, wherein the audit log stores a plurality of key identifiers, and wherein the first key identifier identifies a location in a key store and a parent key;
retrieving an object from the location in the key store identified by the first key identifier, wherein the object comprises an encrypted version of a key and an encrypted version of a second key identifier;
decrypting, using the parent key identified by the first key identifier, the encrypted version of the key to form a decrypted version of the key;
decrypting, using the decrypted version of the key, the encrypted version of the second key identifier to form a decrypted version of the second key identifier;
determining a validity of the decrypted version of the key based at least in part on a comparison of the first key identifier and the decrypted version of the second key identifier; and
determining a need for generating an alert message based at least in part on the determined validity of the decrypted version of the key.

2. The computer-implemented method of claim 1, wherein the determined validity indicates the decrypted version of the key is invalid in response to a determination that the first key identifier and the decrypted version of the second key identifier do not correlate.

3. The computer-implemented method of claim 2, further comprising determining that the decrypted version of the key can no longer be used in response to the determined validity indicating the decrypted version of the key is invalid.

4. The computer-implemented method of claim 1, wherein the determined validity indicates the decrypted version of the key is invalid, wherein the alert message is determined to be needed, and wherein the computer-implemented method further comprises:
receiving a request from another computing device to decrypt data using the decrypted version of the key; and
transmitting the alert message to the other computing device.

5. The computer-implemented method of claim 1, wherein the determined validity indicates the decrypted version of the key is invalid, wherein the alert message is determined to be needed, and wherein the computer-implemented method further comprises:
determining that another computing device received data encrypted using the decrypted version of the key; and
transmitting the alert message to the other computing device.

6. The computer-implemented method of claim 1, wherein the determined validity indicates the decrypted version of the key is invalid, and wherein the computer-implemented method further comprises restoring a backed-up version of the object to the key store in place of the object.

7. A system comprising:
a computer data repository maintained in a non-transitory storage device, the computer data repository configured to at least store a plurality of objects; and
a computing system comprising one or more computing devices, the computing system in communication with the computer data repository and configured to at least:
retrieve a first key identifier and a first value from an entry in an audit log, wherein the first key identifier identifies a location in the computer data repository and a parent key,
retrieve an object from the location in the computer data repository identified by the first key identifier, wherein the object comprises an encrypted version of a key and an encrypted version of a second value;
decrypt, using the parent key identified by the first key identifier, the encrypted version of the key to generate a decrypted version of the key;
decrypt, using the decrypted version of the key, the encrypted version of the second value to generate a decrypted version of the second value; and
determine a validity of the decrypted version of the key based at least in part on a status of an operation applied to at least one of the object, the encrypted version of the key, the encrypted version of the second value, the first value, or the decrypted version of the second value.

8. The system of claim 7, wherein the validity of the decrypted version of the key is determined based at least in part on a status of an operation applied to the object, and wherein the status of the operation applied to the object indicates a failure of the operation to retrieve the object.

9. The system of claim 7, wherein the validity of the decrypted version of the key is determined based at least in part on a status of an operation applied to the encrypted version of the key, and wherein the status of the operation applied to the encrypted version of the key indicates a failure of the operation to decrypt the encrypted version of the key.

10. The system of claim 7, wherein the validity of the decrypted version of the key is determined based at least in part on the encrypted version of the second value, and wherein the status of the operation applied to the encrypted version of the second value indicates a failure of the operation to decrypt the encrypted version of the second value.

11. The system of claim 7, wherein the validity of the decrypted version of the key is determined based at least in part on the first value, and wherein the status of the operation applied to the first value indicates that the first value and the decrypted version of the second value do not correlate.

12. The system of claim 7, wherein the validity of the decrypted version of the key is determined based at least in part on the decrypted version of the second value, and wherein the status of the operation applied to the decrypted version of the second value indicates that the first value and the decrypted version of the second value do not correlate.

13. The system of claim 7, wherein the determined validity indicates the decrypted version of the key is not valid, and wherein the computing system is further configured to at least generate an alert indicating that the decrypted version of the key is not valid.

14. The system of claim 7, wherein the computing system is further configured to at least transmit the alert to another computing device in response to a request from the other computing device to decrypt data using the decrypted version of the key.

15. The system of claim 7, wherein the computing system is further configured to at least transmit the alert to another computing device based at least in part on a determination that the other computing device received data encrypted using the decrypted version of the key.

16. The system of claim 7, wherein the determined validity indicates the key is not valid, and wherein the computing system is further configured to at least restore a backed-up version of the object to the computer data repository in place of the object.

17. The system of claim 7, wherein the object further comprises a parent key identifier, and wherein the computing system is further configured to at least
retrieve the parent key from a location identified by the parent key identifier.

18. A computer storage system comprising a non-transitory storage device, said computer storage system having stored thereon executable program instructions that direct a computer system to at least:
generate a first key;
determine an identifier associated with the first key, wherein the identifier identifies a location at which the first key is stored;
encrypt, using the first key, the identifier associated with the first key to generate an encrypted version of the identifier;
encrypt the first key using a parent key to generate an encrypted version of the first key;
store the encrypted version of the first key and the encrypted version of the identifier in a key store at a location identified by the identifier; and
store the identifier in an audit log, wherein the computer system uses identifiers stored in the audit log to continuously verify the validity of keys stored at locations in the key store identified by the identifiers.

19. The computer storage system of claim 18, wherein the executable program instructions further direct the computer system to at least generate the first key in response to a request from another computing device to encrypt data.

20. The computer storage system of claim 18, wherein the parent key is stored in a second key store associated with a second computer system.

21. The computer storage system of claim 18, wherein the executable program instructions further direct the computer system to at least:
retrieve the identifier from the audit log;
retrieve, from the key store, the encrypted version of the first key and the encrypted version of the identifier using the retrieved identifier;
decrypt the encrypted version of the first key to generate a decrypted version of the first key;
decrypt, using the decrypted version of the first key, the encrypted version of the identifier to generate a decrypted version of the identifier;
compare the retrieved identifier and the decrypted version of the identifier; and
generate an alert indicating that the first key is not valid in response to a determination that the retrieved identifier and the decrypted version of the identifier do not correlate.

22. The computer storage system of claim 21, wherein the executable program instructions further direct the computer system to at least transmit the alert to another device in response to a request from the other device to decrypt data using the decrypted version of the first key.

23. The computer storage system of claim 21, wherein the executable program instructions further direct the computer system to at least transmit the alert to another device based at least in part on a determination that the other device received data encrypted using the decrypted version of the first key.

24. The computer storage system of claim 18, wherein the encrypted version of the first key and the encrypted version of the identifier are encapsulated in an object, and wherein the executable program instructions further direct the computer system to at least store the object in the key store at the location identified by the identifier.

25. A computer-implemented method of verifying key integrity, the computer-implemented method comprising:
by execution of specific program instructions by a computing device:
retrieving a first key identifier from an entry in an audit log, wherein the audit log stores a plurality of key identifiers, and wherein the first key identifier identifies a location in a key store;
retrieving an object from the location in the key store identified by the first key identifier, wherein the object comprises an encrypted version of a key and an encrypted version of a second key identifier;
decrypting the encrypted version of the key to form a decrypted version of the key;
decrypting, using the decrypted version of the key, the encrypted version of the second key identifier to form a decrypted version of the second key identifier;
determining that the decrypted version of the key is invalid in response to a determination that the first key identifier and the decrypted version of the second key identifier do not correlate;
determining that the decrypted version of the key can no longer be used in response to determining that the decrypted version of the key is invalid; and
determining a need for generating an alert message based at least in part on the determined invalidity of the decrypted version of the key.

26. A computer-implemented method of verifying key integrity, the computer-implemented method comprising:
by execution of specific program instructions by a computing device:
retrieving a first key identifier from an entry in an audit log, wherein the audit log stores a plurality of key identifiers, and wherein the first key identifier identifies a location in a key store;
retrieving an object from the location in the key store identified by the first key identifier, wherein the object comprises an encrypted version of a key and an encrypted version of a second key identifier;
decrypting the encrypted version of the key to form a decrypted version of the key;
decrypting, using the decrypted version of the key, the encrypted version of the second key identifier to form a decrypted version of the second key identifier;
determining that the decrypted version of the key is invalid based at least in part on a comparison of the first key identifier and the decrypted version of the second key identifier;

determining a need for generating an alert message based at least in part on the determined validity of the decrypted version of the key; and restoring a backed-up version of the object to the key store in place of the object.

27. A system comprising:

a computer data repository maintained in a non-transitory storage device, the computer data repository configured to at least store a plurality of objects; and a computing system comprising one or more computing devices, the computing system in communication with the computer data repository and configured to at least:

retrieve a first key identifier and a first value from an entry in an audit log, wherein the first key identifier identifies a location in the computer data repository;

retrieve an object from the location in the computer data repository identified by the first key identifier, wherein the object comprises an encrypted version of a key and an encrypted version of a second value;

decrypt the encrypted version of the key to generate a decrypted version of the key;

decrypt, using the decrypted version of the key, the encrypted version of the second value to generate a decrypted version of the second value; and determine that the decrypted version of the key is invalid based at least in part on a status of an operation applied to at least one of the object, the encrypted version of the key, the encrypted version of the second value, the first value, or the decrypted version of the second value; and restore a backed-up version of the object to the computer data repository in place of the object.

* * * * *